(12) United States Patent
Aso

(10) Patent No.: US 12,099,275 B2
(45) Date of Patent: Sep. 24, 2024

(54) LIQUID CRYSTAL DISPLAY DEVICE

(71) Applicant: SHARP KABUSHIKI KAISHA, Sakai (JP)

(72) Inventor: Kohichi Aso, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/085,940

(22) Filed: Dec. 21, 2022

(65) Prior Publication Data

US 2023/0119542 A1   Apr. 20, 2023

Related U.S. Application Data

(63) Continuation of application No. 17/075,025, filed on Oct. 20, 2020, now Pat. No. 11,561,436.

(60) Provisional application No. 62/924,353, filed on Oct. 22, 2019.

(51) Int. Cl.
| | |
|---|---|
| *G02F 1/13357* | (2006.01) |
| *F21V 8/00* | (2006.01) |
| *G02F 1/1334* | (2006.01) |
| *G02F 1/1335* | (2006.01) |
| *G02F 1/1347* | (2006.01) |

(52) U.S. Cl.
CPC ..... *G02F 1/133621* (2013.01); *G02B 6/0055* (2013.01); *G02B 6/0068* (2013.01); *G02F 1/133615* (2013.01); *G02F 1/1347* (2013.01); *G02F 1/13476* (2013.01); *G02F 1/1334* (2013.01); *G02F 1/133622* (2021.01)

(58) Field of Classification Search
CPC ......... G02F 1/133621; G02F 1/133615; G02F 1/1347; G02F 1/13476; G02F 1/133622; G02F 1/1334; G02B 6/0055; G02B 6/0068

See application file for complete search history.

(56) References Cited

U.S. PATENT DOCUMENTS

| | | | |
|---|---|---|---|
| 2017/0116937 A1* | 4/2017 | Du | G09G 3/3644 |
| 2018/0106958 A1* | 4/2018 | Zeng | G02B 6/0088 |
| 2021/0064836 A1* | 3/2021 | Mori | G02B 5/3025 |
| 2021/0318563 A1* | 10/2021 | Wu | G02F 1/1347 |

* cited by examiner

*Primary Examiner* — Nathanael R Briggs
(74) *Attorney, Agent, or Firm* — ScienBiziP, P.C.

(57) ABSTRACT

The liquid crystal display device includes an edge backlight including a transparent light guide plate and light-emitting elements of multiple colors that are disposed such that the light-emitting elements of multiple colors are adjacent to each other, a dimming liquid crystal layer that is disposed such that the dimming liquid crystal layer overlaps at least an end portion of the transparent light guide plate that faces the light-emitting elements of multiple colors in a plan view and that has a degree of haze that increases or decreases by applying a voltage, and a transmissive liquid crystal display panel that includes pixels. With the backlight on, the dimming liquid crystal layer is in a diffusion state, and the liquid crystal display panel performs the color display. With the backlight off, the dimming liquid crystal layer is in a transmission state, and the liquid crystal display panel performs the transparent display.

18 Claims, 6 Drawing Sheets

LIQUID CRYSTAL DISPLAY DEVICE

CROSS-REFERENCE TO RELATED APPLICATION

The present application claims priority Provisional Application No. 62/924,353, the content to which is hereby incorporated by reference into this application.

BACKGROUND OF THE INVENTION

1. Field of the Invention

A disclosure relates to a liquid crystal display device.

2. Description of the Related Art

A liquid crystal display device is a display device that uses a liquid crystal composition for display, and a representative display method thereof involves controlling the amount of light that is transmitted through a liquid crystal panel in a manner in which a backlight emits light toward the liquid crystal panel in which a liquid crystal composition is enclosed between a color filter substrate and a facing substrate, a voltage is applied to the liquid crystal composition, and the orientation of liquid crystal molecules is changed. Such a liquid crystal display device has properties such as thinness, light weight, and low power consumption and is used for electronic devices such as a television, a smartphone, a tablet terminal, and a car navigation device.

In recent years, a display device that functions such that the background of a display screen is seen through has been developed, and such a display device is called, for example, a see-through display. In the see-through display, a portion that overlaps the display screen including a backlight is composed of a transparent material. International Publication No. 2018/193959 discloses that a display device functions such that a rear portion of a display screen is seen through and that the display screen is easily recognized by controlling the transparent color of light for every pixel by using a transparent color control element even when the rear portion of the display screen is bright. International Publication No. 2017/082129 discloses a display device that can display a color image in any color during field sequential drive and also enables see-through display.

In some cases, a dimming member that can adjust, for example, transmittance and reflectance by applying a voltage is used for a display device. For example, Japanese Unexamined Patent Application Publication No. 2000-122085 discloses an argument that in an electronic device, a backlight and liquid crystal dimming glass the transmittance and reflectance of which can be freely changed by applying a voltage are used in order to increase variations in colors to be displayed, to make the colors bright, and to increase the vividness of the colors to be displayed.

SUMMARY OF THE INVENTION

A see-through display that uses an edge-light (edge) backlight that includes light-emitting elements of multiple colors performs color display such that an image is displayed with the backlight on and performs transparent display such that a background is seen through with the backlight off. In some cases where a display device that includes the edge-light backlight performs the color display by using field sequential drive, when light that is emitted from the light-emitting elements of multiple colors enters a transparent light guide plate, colors are mixed, and striated color unevenness is observed at a portion of the transparent light guide plate that the light enters.

Even in a display device that does not perform the transparent display, for example, in a liquid crystal display device that includes an edge backlight that includes a white light-emitting element, spot-like luminance unevenness (eyeball unevenness) occurs in some cases, and there is a method in which the eyeball unevenness is canceled by stacking a reflective member such as a diffusion sheet on a light guide plate to cause light to scatter. However, the see-through display, which performs the transparent display, cannot include, for example, the diffusion sheet. In Japanese Unexamined Patent Application Publication No. 2000-122085 described above, performing the transparent display is not considered.

The disclosure has been accomplished in view of the circumstances described above and relates to a liquid crystal display device that performs the color display by using the field sequential drive, and it is an object of the disclosure to provide a liquid crystal display device that can perform both of the color display and the transparent display while inhibiting color unevenness from occurring.

(1) According to an embodiment of the disclosure, a liquid crystal display device performs color display by using field sequential drive such that light-emitting elements of multiple colors are switched and turned on every certain time and performs transparent display such that a background is seen through. The liquid crystal display device includes an edge backlight including a transparent light guide plate and the light-emitting elements of multiple colors that are disposed such that the light-emitting elements of multiple colors are adjacent to each other and face a side surface of the transparent light guide plate, a dimming liquid crystal layer that is disposed such that the dimming liquid crystal layer overlaps at least an end portion of the transparent light guide plate that faces the light-emitting elements of multiple colors in a plan view and that has a degree of haze that increases or decreases by applying a voltage, and a transmissive liquid crystal display panel that includes pixels, the edge backlight, the dimming liquid crystal layer, and the transmissive liquid crystal display panel being arranged in this order from a back surface to a front surface of the liquid crystal display device. With the backlight on, the dimming liquid crystal layer is in a diffusion state in which light that is incident on the dimming liquid crystal layer from the backlight diffuses, and the liquid crystal display panel performs the color display. With the backlight off, the dimming liquid crystal layer is in a transmission state in which light that is incident via the back surface of the liquid crystal display device is transmitted to the front surface of the liquid crystal display device, and the liquid crystal display panel performs the transparent display.

(2) According to an embodiment of the disclosure, the liquid crystal display panel includes a first transparent substrate, a liquid crystal layer, and a second transparent substrate that are arranged in a direction from the front surface to the back surface of the liquid crystal display device, and the dimming liquid crystal layer is interposed between the second transparent substrate and a third transparent substrate, in addition to the structure of (1) described above.

(3) According to an embodiment of the disclosure, the liquid crystal display panel includes a first transparent substrate, a liquid crystal layer, and a second transparent substrate that are arranged in a direction from the front surface to the back surface of the liquid crystal display device, and the dimming liquid crystal layer is interposed between a fourth transparent substrate and a fifth transparent substrate, in addition to the structure of (1) described above.

(4) According to an embodiment of the disclosure, the dimming liquid crystal layer is interposed between the transparent light guide plate and a sixth transparent substrate, in addition to the structure of (1) described above.

(5) According to an embodiment of the disclosure, the dimming liquid crystal layer is disposed so as to overlap a display region of the liquid crystal display panel in a plan view, in addition to the structure of any one of (1) to (4) described above.

(6) According to an embodiment of the disclosure, the transparent light guide plate has a light emission area that is seen in front of the front surface of the liquid crystal display device with the backlight on, and wherein distances from the light-emitting elements of multiple colors to the light emission area are 15 mm or less, in addition to the structure of any one of (1) to (5) described above.

The disclosure relates to a liquid crystal display device that performs the color display by using the field sequential drive and can provide a liquid crystal display device that can perform both of the color display and the transparent display while inhibiting color unevenness from occurring.

DETAILED DESCRIPTION OF THE INVENTION

A liquid crystal display device according to an embodiment of the disclosure will hereinafter be described. The disclosure is not limited to the contents of the embodiment described below, and design can be appropriately changed within a range in which structures according to the disclosure are sufficient.

The liquid crystal display device according to the embodiment of the disclosure performs color display by using field sequential drive such that light-emitting elements of multiple colors are switched and turned on every certain time and performs transparent display such that a background is seen through. The liquid crystal display device includes an edge backlight including a transparent light guide plate and the light-emitting elements of multiple colors that are disposed such that the light-emitting elements of multiple colors are adjacent to each other and face a side surface of the transparent light guide plate, a dimming liquid crystal layer that is disposed such that the dimming liquid crystal layer overlaps at least an end portion of the transparent light guide plate that faces the light-emitting elements of multiple colors in a plan view and that has a degree of haze that increases or decreases by applying a voltage, and a transmissive liquid crystal display panel that includes pixels, the edge backlight, the dimming liquid crystal layer, and the transmissive liquid crystal display panel being arranged in this order from a back surface to a front surface of the liquid crystal display device. With the backlight on, the dimming liquid crystal layer is in a diffusion state in which light that is incident on the dimming liquid crystal layer from the backlight diffuses, and the liquid crystal display panel performs the color display. With the backlight off, the dimming liquid crystal layer is in a transmission state in which light that is incident via the back surface of the liquid crystal display device is transmitted to the front surface of the liquid crystal display device, and the liquid crystal display panel performs the transparent display.

Figure 1:
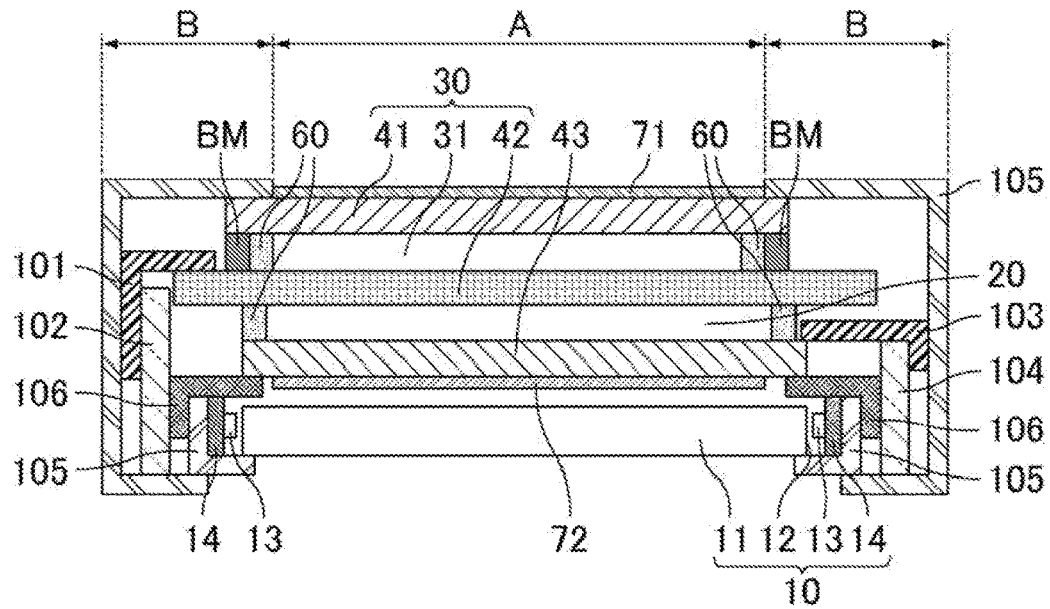
FIG. 1 schematically illustrates a sectional view of an example of a liquid crystal display device according to an embodiment.

The structure of the liquid crystal display device according to the embodiment will now be described with reference to FIG. 1. FIG. 1 schematically illustrates a sectional view of an example of the liquid crystal display device according to the embodiment. As illustrated in FIG. 1, the liquid crystal display device according to the embodiment of the disclosure includes an edge backlight 10, a dimming liquid crystal layer 20, and a liquid crystal display panel 30 that are arranged in this order from the back surface to the front surface of the liquid crystal display device. A display region A in FIG. 1 is a region in which a freely selected image, for example, is displayed during the color display. A picture frame region B is located around the outer edge of the display region A. The picture frame region B described above overlaps a bezel 105 that secures members and may not allow light to transmit therethrough. A front polarizer 71 may be disposed on a front surface of a first transparent substrate 41, a back polarizer 72 may be disposed on a back surface of a third transparent substrate 43, and transmission axes of the polarizers are perpendicular to each other in a crossed-Nicol manner.

Figure 2:
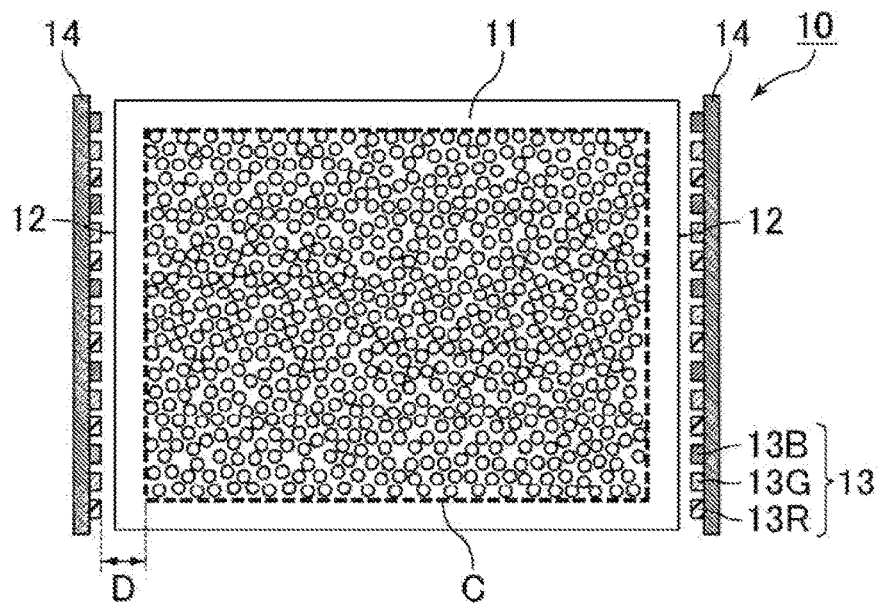
FIG. 2 schematically illustrates a plan view of an example of the structure of a backlight.

The backlight 10 is an edge backlight. FIG. 2 schematically illustrates a plan view of an example of the structure of the backlight. As illustrated in FIG. 2, the backlight 10 includes a transparent light guide plate 11, and light-emitting elements 13 of multiple colors that are disposed so as to be adjacent to each other and so as to face side surfaces 12 of the transparent light guide plate 11. For the transparent display, the backlight 10 includes an optically transmissive member in a region that overlaps the display region A and does not include a member that causes light to diffuse such as a diffusion sheet that is widely used in the blacklight industry.

The liquid crystal display device according to the embodiment of the disclosure performs the color display by using the field sequential drive such that the light-emitting elements of multiple colors are switched and turned on every certain time. The light-emitting elements of multiple colors described above are monochromatic light-emitting elements having different luminescent colors. With the light-emitting elements of different colors disposed so as to be adjacent to each other, the color of light emitted in a first field by using the field sequential drive and another color of light emitted in a next field are mixed at a portion of the transparent light guide plate that the light enters, and striated color unevenness (also referred to as iridescent unevenness) occurs. In the liquid crystal display device described above, the dimming liquid crystal layer 20 is disposed between the backlight 10 and the liquid crystal display panel 30, and iridescent unevenness can be consequently inhibited from occurring between the light-emitting elements of multiple colors that are disposed such that the light-emitting elements of multiple colors are adjacent to each other. The liquid crystal display device described above performs the color display by sequentially turning on the light-emitting elements of multiple colors and includes no color filter.

The light-emitting elements 13 of multiple colors include, for example, red light-emitting elements 13R, green light-emitting elements 13G, and blue light-emitting elements 13B. In FIG. 2, the light-emitting elements 13 of multiple colors are repeatedly arranged in order of the red, green, and blue colors. However, as for the arrangement of the light-emitting elements 13 of multiple colors, the order of the colors is not limited, provided that the light-emitting elements of different colors are disposed so as to be adjacent to each other in a region. In FIG. 1 and FIG. 2, the light-emitting elements 13 of multiple colors are disposed so as to face two opposing side surfaces of the transparent light guide plate 11 but may be disposed so as to face one of the side surfaces of the transparent light guide plate 11. The light-emitting elements 13 of multiple colors may be disposed on light-emitting element substrates 14.

For example, the light-emitting elements described above are preferably light-emitting diodes (LED).

Figure 3:
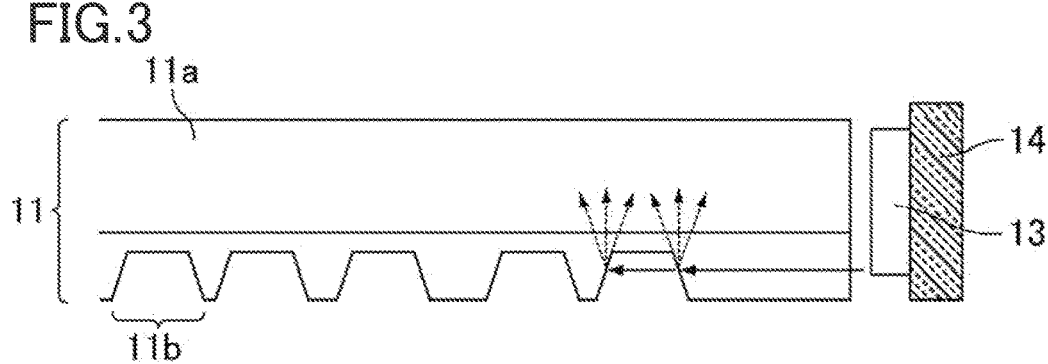
FIG. 3 schematically illustrates a sectional view of an example of the structure of the backlight.

The transparent light guide plate 11 is a transparent member that radiates light that is incident via the side surfaces 12 from the light-emitting elements 13 of multiple colors toward the front surface of the liquid crystal display device. The transparent light guide plate 11 has a reflection structure 11b on a back surface (that faces in the direction toward the back surface of the liquid crystal display device) of a plate-like transparent base material 11a. The reflection structure 11b of the transparent light guide plate 11 is preferably disposed so as to face in the direction toward the back surface of the liquid crystal display device. FIG. 3 schematically illustrates a sectional view of an example of the structure of the backlight. An upper part in FIG. 3 (the plate-like transparent base material 11a) faces in the direction toward the front surface of the liquid crystal display device. As illustrated in FIG. 3, the transparent light guide plate 11 is disposed such that the reflection structure 11b faces in the direction toward the back surface of the liquid crystal display device and can consequently radiate the light that is incident via the side surfaces 12 from the light-emitting elements 13 of multiple colors toward the front surface of the liquid crystal display device.

The reflection structure 11b preferably has recessed portions. Examples of the shape of each recessed portion described above include a semicircular shape, a columnar shape, and a truncated cone shape. The recessed portions described above are preferably arranged irregularly such that luminance at the center of the transparent light guide plate is the maximum. As for the transparent light guide plate 11, the recessed portions that have a columnar shape or a truncated cone shape are preferably arranged irregularly on the back surface thereof. This enables the light that is incident via the side surfaces 12 from the light-emitting elements 13 of multiple colors to be more efficiently radiated toward the front surface of the liquid crystal display device.

In a plan view, the reflection structure 11b is preferably disposed in a region that is seen in front of the front surface of the liquid crystal display device described above with the backlight described above on. The "region that is seen in front of the front surface of the liquid crystal display device with the backlight on" described above is also referred to as a "light emission area". The light emission area described above corresponds to a region that is surrounded by a dotted line in FIG. 2. The display region A illustrated in FIG. 1 corresponds to the light emission area C of the transparent light guide plate 11.

In recent years, there has been a need to narrow the picture frame region of a liquid crystal display device. As for a liquid crystal display device that has a narrow picture frame, distances from the light-emitting elements of multiple colors described above to the light emission area described above are short. The "distances from the light-emitting elements of multiple colors to the light emission area" described above are also referred to as "entrance lengths" and are illustrated by D in FIG. 2. The present inventor has considered and found that when the entrance lengths D are short, light that is emitted from the light-emitting elements 13 of multiple colors reaches the light emission area of the transparent light guide plate 11 before the light diffuses, and the iridescent unevenness described above tends to occur. The transparent light guide plate 11 preferably has the light emission area that is seen in front of the front surface of the liquid crystal display device described above with the backlight described above on, and the distances from the light-emitting elements of multiple colors described above to the light emission area described above are preferably 15 mm or less. A liquid crystal display device in which the entrance lengths described above are 15 mm or less is likely cause the iridescent unevenness. However, the use of the structure according to the disclosure that includes the dimming liquid crystal layer enables the iridescent unevenness to be more effectively inhibited from occurring even in the liquid crystal display device in which the entrance lengths described above are short, and the picture frame is narrow. The lower limit of the entrance lengths described above is, for example, 1 mm and may be 3 mm but is not particularly limited thereto.

Regarding other methods, the iridescent unevenness can be inhibited from occurring by increasing the entrance lengths described above to a certain extent. From the perspective that the iridescent unevenness is inhibited from occurring by increasing the entrance lengths described above, the entrance lengths described above are preferably 50 mm or more.

For example, acrylic resin is used for the transparent light guide plate 11. Examples of the acrylic resin described above include acrylic ester and methacrylic acid ester. The acrylic resin described above may be thermosetting or photocurable resin. The transparent light guide plate 11 can be manufactured by, for example, a method described below. A thermosetting acrylic resin composition that contains a thermal polymerization initiator is first heated and cured to manufacture the plate-like transparent base material 11a.

Subsequently, a photocurable acrylic resin composition is applied to the back surface of the plate-like transparent base material 11a and is cured by being irradiated with ultraviolet rays with a resist having recessed portions pressed to form the recessed portions as the reflection structure 11b.

The dimming liquid crystal layer 20 is disposed so as to overlap at least end portions of the transparent light guide plate 11 that face the light-emitting elements 13 of multiple colors in a plan view. The light that is emitted from the light-emitting elements 13 of multiple colors enters via the side surfaces 12 of the transparent light guide plate 11. The end portions of the transparent light guide plate described above include not only the side surfaces 12 of the transparent light guide plate 11 but also portions of the transparent light guide plate 11 that the light enters. At the end portions of the transparent light guide plate described above that are near the side surfaces 12 in a plan view, the light-emitting elements of different colors that are disposed so as to be adjacent to each other are likely to mix the colors, and the iridescent unevenness is likely to occur. For this reason, the dimming liquid crystal layer 20 is disposed so as to overlap at least the end portions described above in a plan view, and the iridescent unevenness can be consequently inhibited from occurring. The dimming liquid crystal layer described above is preferably disposed so as to overlap the display region of the liquid crystal display panel described above in a plan view. From the perspective that end portions of the dimming liquid crystal layer described above are contained in the picture frame region B, the dimming liquid crystal layer is more preferably disposed so as to overlap the entire display region described above. In the case where the dimming liquid crystal layer described above is disposed so as to overlap the entire display region A, the area of the dimming liquid crystal layer described above is preferably larger than the area of the display region A, and the outer edge of the dimming liquid crystal layer described above is preferably located outside the outer edge of the display region A.

Figure 4:
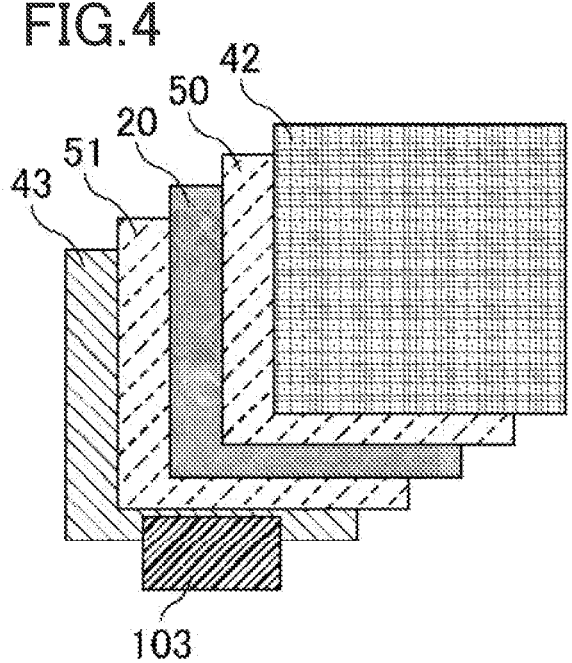
FIG. 4 schematically illustrates an example of components including a dimming liquid crystal layer.
Figure 6:
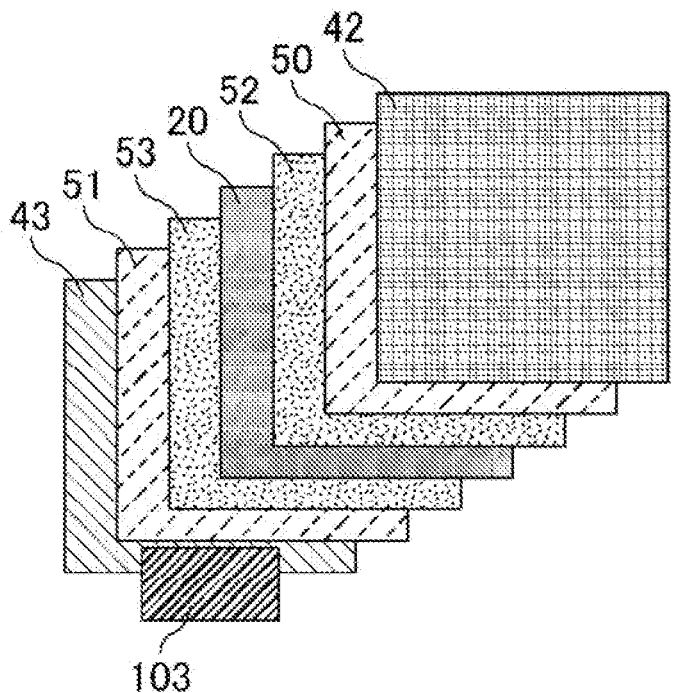
FIG. 6 schematically illustrates another example of components including the dimming liquid crystal layer.

The dimming liquid crystal layer 20 is a dimming member that has the degree of haze that increases or decreases by applying a voltage. When the degree of haze of the dimming liquid crystal layer 20 decreases, and the amount of light that is transmitted through the dimming liquid crystal layer 20 increases, the state of the dimming liquid crystal layer 20 becomes a transmission state in which the light that is incident via the back surface of the liquid crystal display device described above is transmitted to the front surface of the liquid crystal display device described above. The transmittance of the dimming liquid crystal layer 20 in the transmission state is preferably close to 100%, more preferably 90% or more. The transmittance described above is the transmittance of a multilayer body (referred to below as a multilayer body A) in which the dimming liquid crystal layer is interposed between a pair of transparent substrates. In the case where transparent electrode films are located at positions nearer than the transparent substrates to the dimming liquid crystal layer as illustrated in FIG. 4 described later by way of example, the multilayer body A described above includes the transparent electrode films described above. In the case where alignment films are located at positions nearer than the positions to the dimming liquid crystal layer as illustrated in FIG. 6 by way of example, the multilayer body A described above includes the alignment films described above. The transmittance described above can be calculated as the following expression (1), where A1 is the luminance of the liquid crystal display device that includes the multilayer body A in which the dimming liquid crystal layer is interposed between the pair of the transparent substrates described above at a certain value of grayscale, and B1 is the luminance of a liquid crystal display device that does not include the multilayer body A.

$$\text{Transmittance (\%) of Dimming Liquid CrystalLayer} = A1/B1 \times 100 \quad (1)$$

When the degree of haze of the dimming liquid crystal layer 20 increases, the state of the dimming liquid crystal layer 20 becomes a diffusion state in which light that is incident on the dimming liquid crystal layer 20 from the backlight 10 diffuses. The degree of haze (also referred to as haze) of the dimming liquid crystal layer 20 in the diffusion state is represented by a haze value, and the haze value described above is preferably 60% or more. When the haze value described above is less than 60%, the iridescent unevenness is not sufficiently inhibited from occurring in some cases. To inhibit the iridescent unevenness from occurring, the haze value described above is preferably high, and the upper limit thereof is, for example, 80% but is not particularly limited thereto. In some cases where the haze value described above is more than 80%, an object that is placed behind the liquid crystal display device is difficult to see. The haze value described above corresponds to the haze value of the multilayer body (the multilayer body A described above) in which the dimming liquid crystal layer is interposed between the pair of the transparent substrates. In the case where the transparent electrode films and the alignment films, for example, are located at the positions nearer than the transparent substrates to the dimming liquid crystal layer as described above, the multilayer body A described above includes these members. The haze value described above can be measured by a method conforming JIS K 7136.

The dimming liquid crystal layer 20 is preferably a polymer dispersed liquid crystal layer. An example of the polymer dispersed liquid crystal layer described above is a layer that contains a liquid crystal compound dispersing in a resin matrix. Examples of resin of which the resin matrix described above is composed include, but not particularly limited to, meth (acrylic) resin, silicone resin, epoxy resin, fluorine resin, polyester resin, and polyimide resin. Examples of the liquid crystal compound described above include, but not particularly limited to, a nematic liquid crystal, a smectic liquid crystal, and a cholesteric liquid crystal, and among these, the nematic liquid crystal is preferable.

The state of the dimming liquid crystal layer 20 may become the transmission state when a voltage is applied thereto and may be in the diffusion state with no voltage applied thereto, or may become the diffusion state when a voltage is applied thereto and may be in the transmission state with no voltage applied thereto.

Referring to FIG. 1, an example of the dimming liquid crystal layer 20 the state of which becomes the transmission state when a voltage is applied thereto and is in the diffusion state with no voltage applied thereto will now be described by using FIG. 4. In an example illustrated in FIG. 1, the liquid crystal display panel 30 includes the first transparent substrate 41, a liquid crystal layer 31, and a second transparent substrate 42 that are arranged in a direction from the front surface to the back surface of the liquid crystal display device, and the dimming liquid crystal layer 20 is interposed between the second transparent substrate 42 and the third transparent substrate 43. However, the structure described above is not a limitation, provided that the dimming liquid crystal layer 20 is disposed between the backlight 10 and the liquid crystal display panel 30.

FIG. 4 schematically illustrates an example of components including the dimming liquid crystal layer. As illustrated in FIG. 4, the dimming liquid crystal layer 20 is interposed, for example, between the second transparent substrate 42 and the third transparent substrate 43, a transparent electrode film 50 is disposed at a position nearer than the second transparent substrate 42 to the dimming liquid crystal layer 20, and a transparent electrode film 51 is disposed at a position nearer than the third transparent substrate 43 to the dimming liquid crystal layer 20. The transparent electrode film 50 and the transparent electrode film 51 face each other with the dimming liquid crystal layer 20 interposed therebetween. One of the transparent electrode films 50 and 51 is connected to a dimming liquid crystal layer driving circuit 103.

Figure 5:
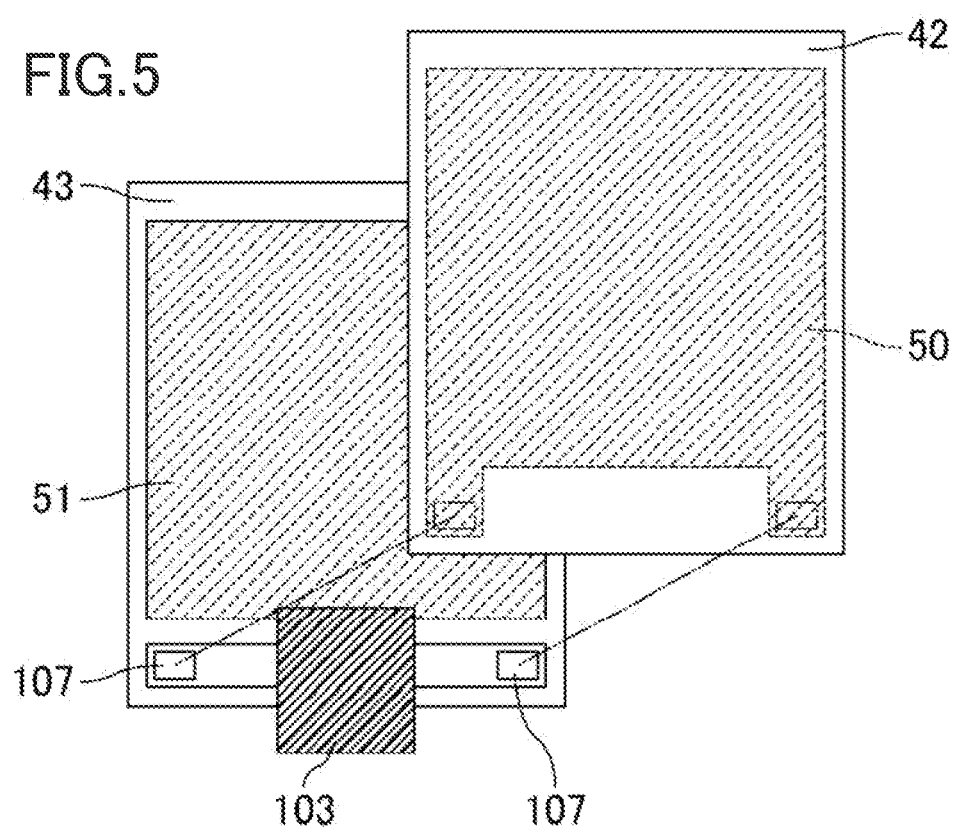
FIG. 5 schematically illustrates an example of a state of connection between a transparent electrode film and a dimming liquid crystal layer driving circuit illustrated in FIG. 4.

FIG. 5 schematically illustrates an example of a state of connection between the transparent electrode film and the dimming liquid crystal layer driving circuit illustrated in FIG. 4. In the case where the dimming liquid crystal layer driving circuit 103 is formed on the third transparent substrate 43 and is connected to the transparent electrode film 51 as illustrated in FIG. 5, the transparent electrode film 50 may be electrically connected to the dimming liquid crystal layer driving circuit 103 with a common transfer portion 107 that is formed on the third transparent substrate 43 interposed therebetween. The common transfer portion 107 contains a conductive material.

When a voltage is applied from the dimming liquid crystal layer driving circuit 103 to the transparent electrode films 50 and 51, an electric field is produced in the thickness direction of the dimming liquid crystal layer 20. Liquid crystal molecules in the dimming liquid crystal layer 20 are oriented along the electric field described above and cause natural light that is incident via the back surface of the liquid crystal display device to be transmitted to the front surface of the dimming liquid crystal layer 20. With no voltage applied, the liquid crystal molecules in the dimming liquid crystal layer 20 are oriented in random directions and cause light that is emitted from the backlight 10 to diffuse. A liquid crystal composition the dielectric anisotropy of which is positive ($\Delta\varepsilon>0$) can be used as a liquid crystal composition that contains such liquid crystal molecules.

Transparent electrode films known in the liquid crystal display device industry may be used as the transparent electrode films 50 and 51, and a transparent conductive material such as indium tin oxide (ITO) and indium zinc oxide (IZO) may be used.

An example of the dimming liquid crystal layer 20 the state of which becomes the diffusion state when a voltage is applied thereto and is in the transmission state with no voltage applied thereto will now be described by using FIG. 6. FIG. 6 schematically illustrates another example of components including the dimming liquid crystal layer. As illustrated in FIG. 6, an alignment film 52 is disposed between the dimming liquid crystal layer 20 and the transparent electrode film 50, and an alignment film 53 is disposed between the dimming liquid crystal layer 20 and the transparent electrode film 51.

When a voltage is applied from the dimming liquid crystal layer driving circuit 103 to the transparent electrode films 50 and 51, the liquid crystal molecules in the dimming liquid crystal layer 20 are angled with respect to the electric field that is produced in the thickness direction of the dimming liquid crystal layer and are inclined with respect to the second transparent substrate 42 and the third transparent substrate 43. Consequently, the light that is emitted from the backlight 10 diffuses. With no voltage applied, the liquid crystal molecules are oriented substantially perpendicular to the second transparent substrate 42 and the third transparent substrate 43, and this brings about the transmission state. A liquid crystal composition the dielectric anisotropy of which is negative ($\Delta\varepsilon<0$) can be used as a liquid crystal composition that contains such liquid crystal molecules. The initial orientation of the liquid crystal molecules with no voltage applied can be controlled by performing an orientation process on the alignment films 52 and 53.

Alignment films known in the liquid crystal display device industry may be used as the alignment films 52 and 53, and alignment films composed of, for example, polyamic acid, polyimide, or polysiloxane may be used.

Figure 7:
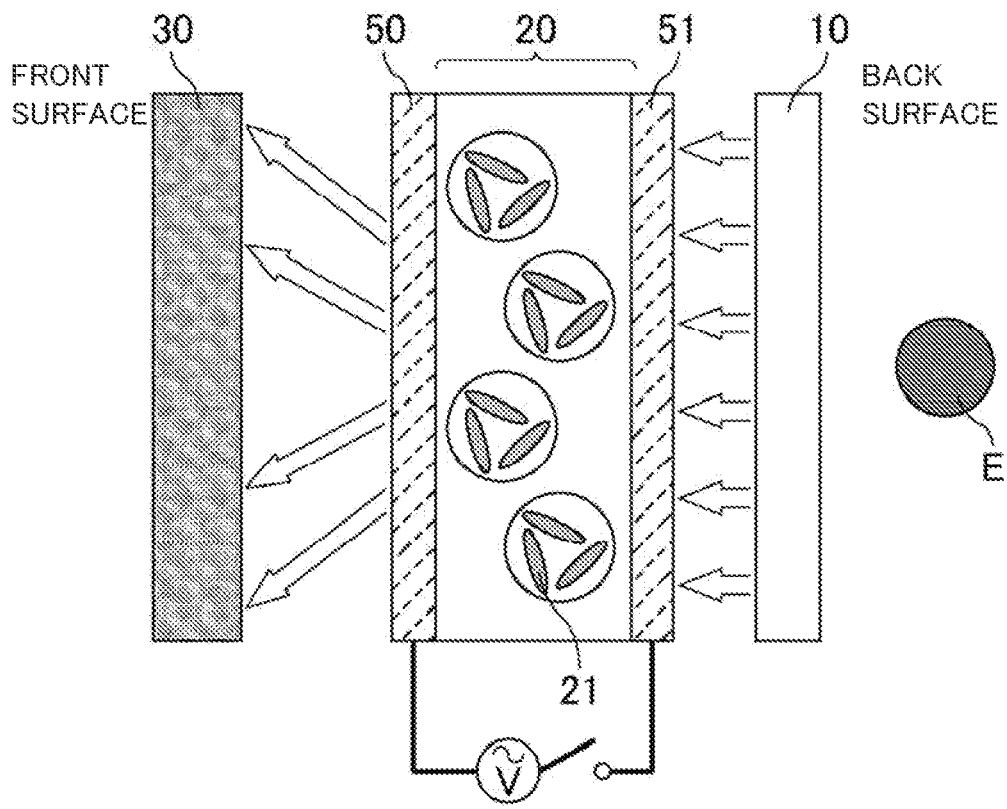
FIG. 7 schematically illustrates states of the backlight, the dimming liquid crystal layer, and a liquid crystal display panel during color display.
Figure 8:
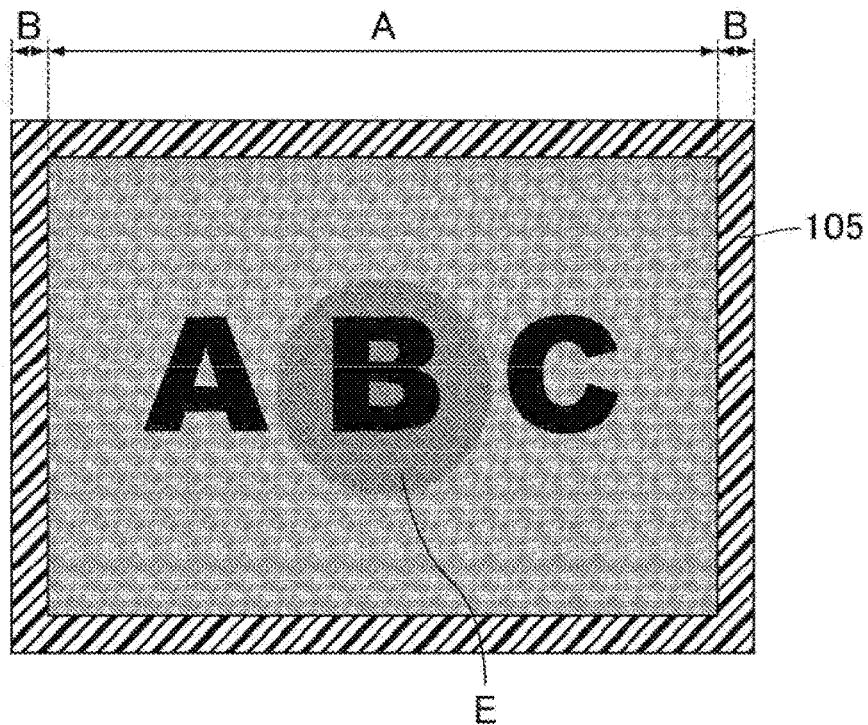
FIG. 8 schematically illustrates a plan view of the liquid crystal display device that is observed in front of a front surface during the color display.

As for the liquid crystal display device according to the embodiment of the disclosure, with the backlight described above on, the dimming liquid crystal layer described above is in the diffusion state in which the light that is incident on the dimming liquid crystal layer described above from the backlight described above diffuses, and the liquid crystal display panel described above performs the color display. Referring to FIG. 1 appropriately, the behavior of the liquid crystal display device during the color display will now be described by using FIG. 7 and FIG. 8. FIG. 7 schematically illustrates states of the backlight, the dimming liquid crystal layer, and the liquid crystal display panel during the color display. FIG. 8 schematically illustrates a plan view of the liquid crystal display device that is observed in front of the front surface during the color display.

During the color display, a color display signal from a liquid crystal display panel driving substrate 102 is written to the liquid crystal display panel 30 (see FIG. 1) via the liquid crystal display panel driving circuit 101, a voltage depending on the color display signal described above is applied to the liquid crystal layer 31, and the amount of light that is transmitted for every pixel is adjusted. In addition, the light-emitting elements 13 of multiple colors that are included in the backlight 10 are turned on in response to the color display signal described above to perform the color display. In conjunction with turning-on of the backlight 10, a voltage that is applied from the dimming liquid crystal layer driving substrate 104 to the dimming liquid crystal layer 20 via the dimming liquid crystal layer driving circuit 103 is adjusted (see FIG. 1), and the state of the dimming liquid crystal layer 20 becomes the diffusion state. In an example illustrated in FIG. 7, the state of the dimming liquid crystal layer 20 becomes the diffusion state with no voltage applied. As illustrated in FIG. 7, liquid crystal molecules 21 are randomly oriented in the diffusion state described above, the dimming liquid crystal layer 20 consequently becomes cloudy, and the light (illustrated by outline arrows in FIG. 7) that is incident on the dimming liquid crystal layer 20 from the backlight 10 diffuses. Accordingly, the iridescent unevenness can be inhibited from occurring between the light-emitting elements of multiple colors. When the liquid crystal display device is observed in front of the front surface during the color display, as illustrated in FIG. 8, an image (for example, letters ABC) is displayed in the display region A of the liquid crystal display device, and an object E that is placed behind the liquid crystal display device is slightly seen.

Figure 9:
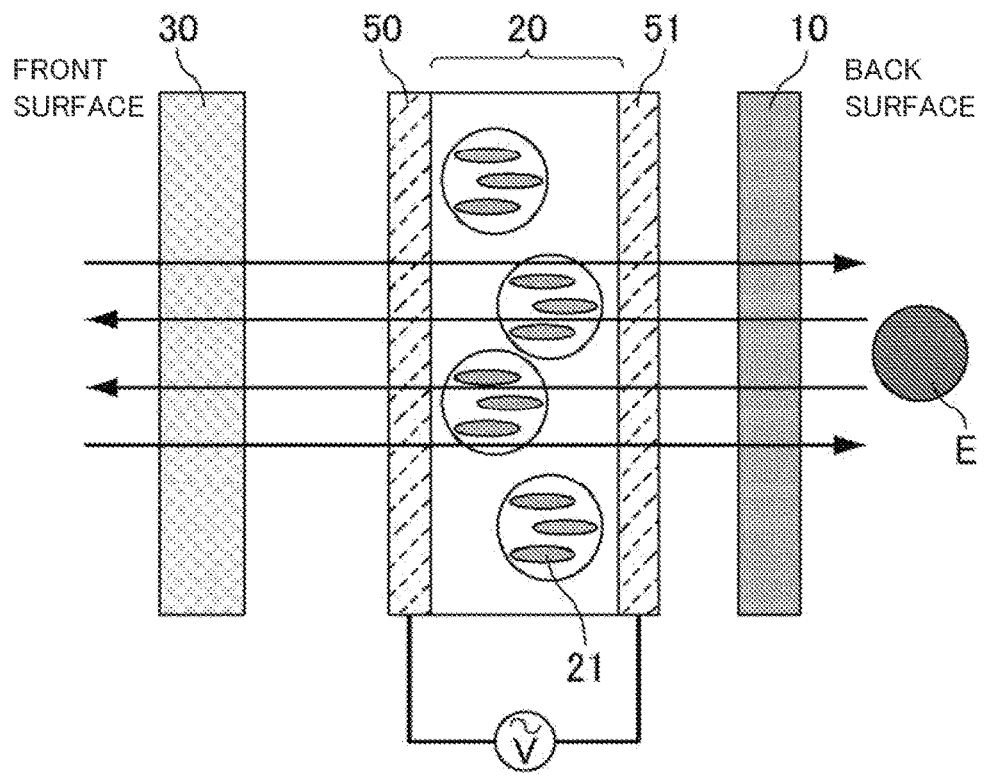
FIG. 9 schematically illustrates states of the backlight, the dimming liquid crystal layer, and the liquid crystal display panel during transparent display.
Figure 10:
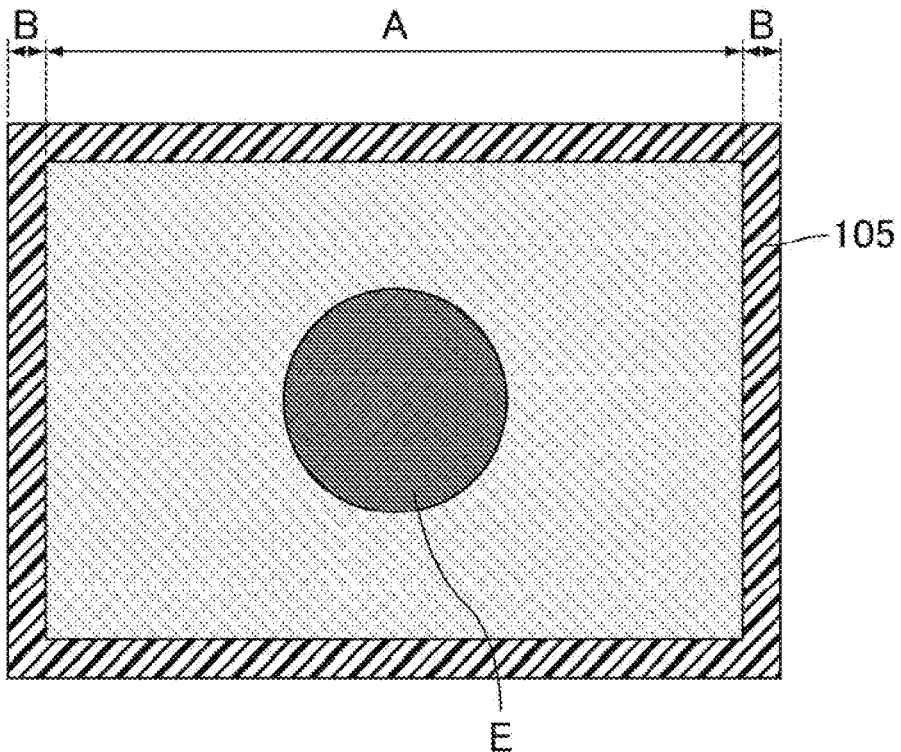
FIG. 10 schematically illustrates a plan view of the liquid crystal display device that is observed in front of the front surface during the transparent display.

As for the liquid crystal display device according to the embodiment of the disclosure, with the backlight described above off, the dimming liquid crystal layer described above is in the transmission state in which the light that is incident via the back surface of the liquid crystal display device described above is transmitted to the front surface of the liquid crystal display device described above, and the liquid crystal display panel described above performs the transparent display. Referring to FIG. 1 appropriately, the behavior of the liquid crystal display device during the transparent display will now be described by using FIG. 9 and FIG. 10. FIG. 9 schematically illustrates states of the backlight, the dimming liquid crystal layer, and the liquid crystal display panel during the transparent display. FIG. 10 schematically illustrates a plan view of the liquid crystal display device that is observed in front of the front surface during the transparent display.

During the transparent display, a transparent display signal from the liquid crystal display panel driving substrate 102 is written to the liquid crystal display panel 30 (see FIG. 1) via the liquid crystal display panel driving circuit 101, the amount of light that is transmitted for every pixel is adjusted, and, for example, the transmittance of the liquid crystal display panel 30 is controlled so as to be the maximum. In conjunction with the transparent display signal described above, the backlight 10 is turned off, a voltage that is applied from the dimming liquid crystal layer driving substrate 104 to the dimming liquid crystal layer 20 via the dimming liquid crystal layer driving circuit 103 is adjusted (see FIG. 1), and the state of the dimming liquid crystal layer 20 becomes the transmission state. In an example illustrated in FIG. 9, the state of the dimming liquid crystal layer 20 becomes the transmission state when the voltage is applied. With the dimming liquid crystal layer 20 being in the transmission state as illustrated in FIG. 9, the natural light that is incident via the back surface of the liquid crystal display device can be transmitted to the front surface of the liquid crystal display device. When the liquid crystal display device is observed in front of the front surface during the transparent display, as illustrated in FIG. 10, no image is displayed in the display region A, and the object E that is placed behind the liquid crystal display device can be clearly seen.

The liquid crystal display panel 30 is transmissive and includes the pixels. The liquid crystal display panel 30 is a member that functions as a shutter element that adjusts the amount of light that is transmitted from the back surface to the front surface of the liquid crystal display device for every pixel by using a combination of the front polarizer 71 and the back polarizer 72. The structure of the liquid crystal display panel 30 is not particularly limited and may be a display panel in an active matrix method.

As illustrated in FIG. 1, an example of the structure of the liquid crystal display panel 30 includes the first transparent substrate 41, the liquid crystal layer 31, and the second transparent substrate 42 that are arranged in the direction from the front surface to the back surface of the liquid crystal display device. A thin-film transistor (TFT) that is a switching element is disposed at a position nearer than the first transparent substrate 41 or the second transparent substrate 42 to the liquid crystal layer 31 at a corner portion of a pixel region that is partitioned by a gate wiring line and a source wiring line, and a pixel electrode that is connected to the TFT described above and a drain wiring line is disposed in the pixel region described above. The pixels described above include the gate wiring line described above, the source wiring line described above, and various members that are disposed in the pixel region described above. The pixels described above are disposed in a region that overlaps the display region A of the liquid crystal display device, and the members that are included in the pixels are composed of a transparent material.

The gate wiring line described above and the source wiring line described above are respectively connected to a gate driver and a source driver in the liquid crystal display panel driving circuit 101 that is disposed in the picture frame region B described above and adjust a voltage that is applied to the liquid crystal layer 31 depending on the signal that is written to the liquid crystal display panel driving substrate 102. The direction of the orientation of the liquid crystal molecules in the liquid crystal layer 31 is changed depending on the voltage described above to increase or decrease the transmittance of each pixel. The liquid crystal layer 31 is not particularly limited, and a liquid crystal layer known in the liquid crystal display device industry can be used. The liquid crystal layer 31 contains a liquid crystal compound but differs from the dimming liquid crystal layer 20 in that the liquid crystal compound does not disperse in a resin matrix.

To perform the color display by using the field sequential drive, the TFT described above preferably switches at a high rate, and a channel layer of the TFT described above preferably contains an oxide semiconductor. An example of the oxide semiconductor described above is an oxide semiconductor that contains indium (In), gallium (Ga), and/or zinc (Zn) such as an indium gallium zinc oxide (In—Ga—Zn—O).

Preferred aspects of the liquid crystal display device according to the embodiment described above will now be described.

The liquid crystal display panel described above preferably includes the first transparent substrate, the liquid crystal layer, and the second transparent substrate that are arranged in the direction from the front surface to the back surface of the liquid crystal display device described above, and the dimming liquid crystal layer described above is preferably interposed between the second transparent substrate described above and the third transparent substrate. The second transparent substrate described above that is a component of the liquid crystal display panel described above is used also as a support body for the dimming liquid crystal layer described above, and this facilitates a manufacturing process. In addition, the liquid crystal display device described above can be thin.

A specific example of the manufacturing process described above will be described. Firstly, a liquid crystal composition for the liquid crystal display panel is sealed between the first transparent substrate described above and the second transparent substrate described above by using a sealing material to form the liquid crystal layer described above, and the liquid crystal display panel described above is manufactured. Subsequently, a region in which the dimming liquid crystal layer is to be formed is drawn by the sealing material on the surface of the second transparent substrate described above opposite the liquid crystal layer described above for bonding to the third transparent substrate described above. At this time, the region is drawn with an inlet formed. Finally, the inlet described above is sealed by injecting a liquid crystal composition for the dimming liquid crystal layer via the inlet described above, and an integrated structure of the liquid crystal display panel described above and the dimming liquid crystal layer described above is consequently obtained. Subsequently, the backlight is disposed on the back surface of the third transparent substrate described above. As illustrated in FIG. 1, the third transparent substrate 43 may be supported by, for example, P chassis 106, and a freely determined gap may be formed between the third transparent substrate 43 and the transparent light guide plate 11.

The first transparent substrate described above, the second transparent substrate described above, and the third transparent substrate described above are not particularly limited, provided that these are transparent members that function as support bodies that support the liquid crystal layers, and transparent resin such as polyethylene terephthalate (PET) and a glass plate may be used. The first and second transparent substrates described above and the third transparent substrate described above may have the same composition or may have different compositions.

Figure 11:
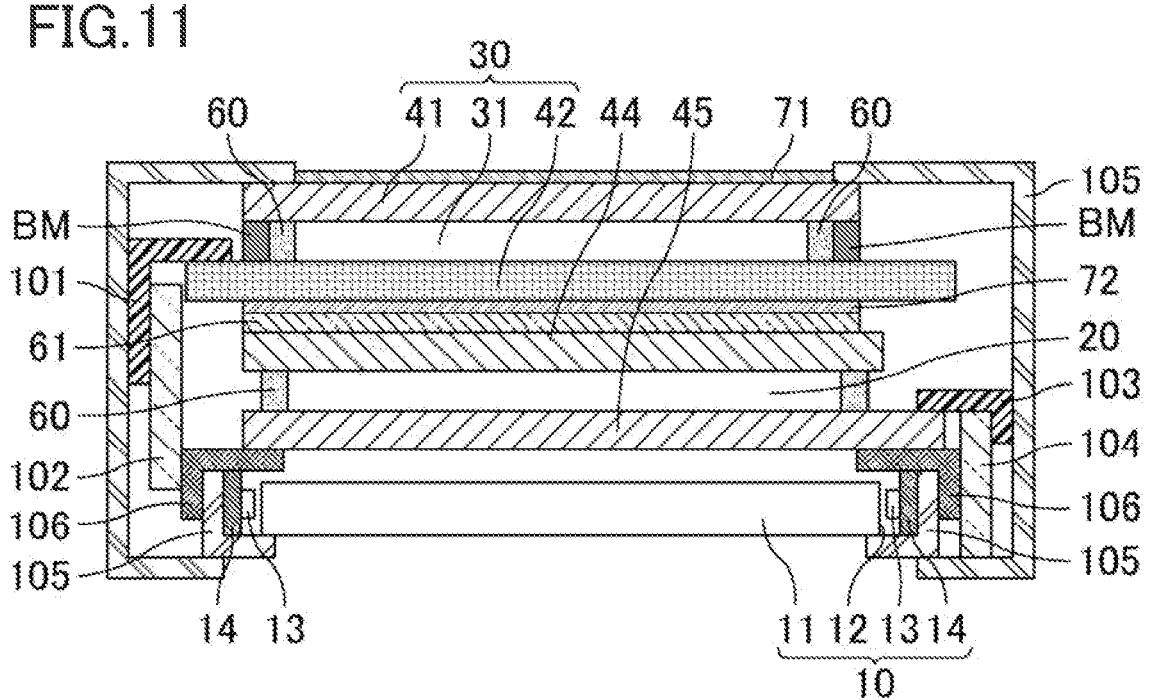
FIG. 11 schematically illustrates a sectional view of a liquid crystal display device according to a first modification to the embodiment.

The liquid crystal display panel described above preferably includes the first transparent substrate, the liquid crystal layer, and the second transparent substrate that are arranged in the direction from the front surface to the back surface of the liquid crystal display device described above, and the dimming liquid crystal layer described above is preferably interposed between a fourth transparent substrate and a fifth transparent substrate. FIG. 11 schematically illustrates a sectional view of a liquid crystal display device according to a first modification to the embodiment. According to the first modification, as illustrated in FIG. 11, the dimming liquid crystal layer 20 is sealed between a fourth transparent substrate 44 and a fifth transparent substrate 45 by using a sealing material 60. Although the liquid crystal display panel 30 has the same structure as that illustrated in FIG. 1, according to the first modification, the second transparent substrate 42 that is included in the liquid crystal display panel 30 is not used as the support body for the dimming liquid crystal layer 20. According to the first modification, the front polarizer 71 may be disposed on the front surface of the first transparent substrate 41, and the back polarizer 72 may be disposed on the back surface of the second transparent substrate 42.

An air layer may be provided between the second transparent substrate 42 and the fourth transparent substrate 44, or a transparent adhesive layer 61 may be disposed therebetween. The transparent adhesive layer 61 is more preferably disposed because the same degree of the transmittance as in the case where the second transparent substrate 42 is used as the support body for the dimming liquid crystal layer 20 illustrated in FIG. 1 is obtained. An optical clear adhesive (OCA) or optical clear resin (OCR), for example, may be used for the transparent adhesive layer 61.

The examples of the first to third transparent substrates described above may be used as the fourth transparent substrate 44 and the fifth transparent substrate 45. The fourth transparent substrate 44 and the fifth transparent substrate 45 may have the same composition or may have different compositions. For example, a dimming film in which the dimming liquid crystal layer 20 is interposed between the fourth transparent substrate 44 composed of resin film and the fifth transparent substrate 45 composed of resin film may be used.

Figure 12:
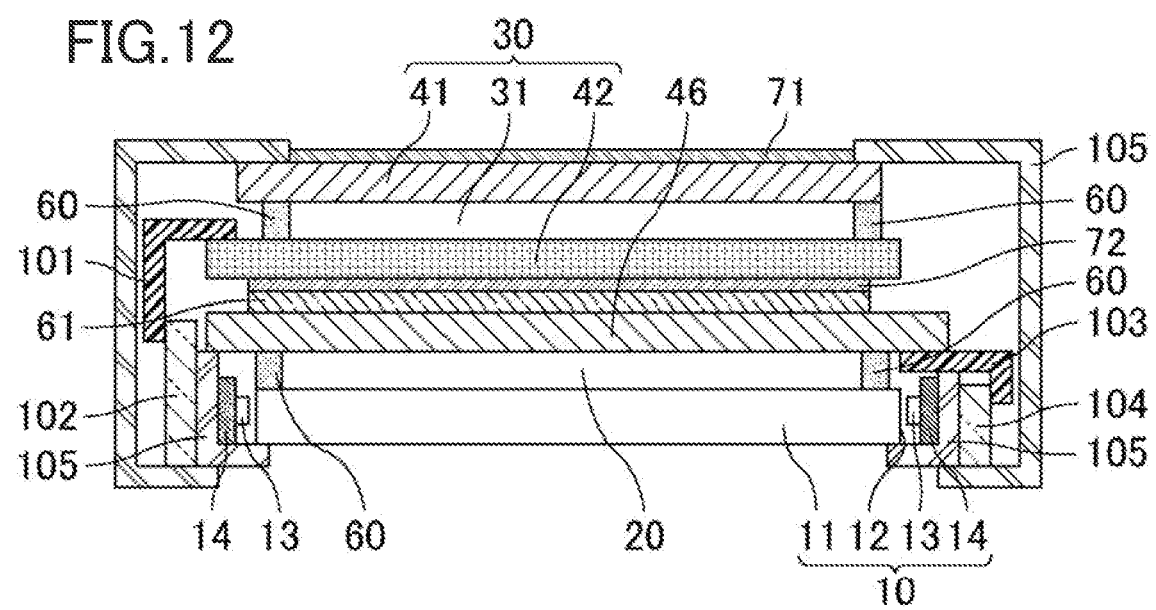
FIG. 12 schematically illustrates a sectional view of a liquid crystal display device according to a second modification to the embodiment.

The dimming liquid crystal layer described above is preferably interposed between the transparent light guide plate described above and a sixth transparent substrate. FIG. 12 schematically illustrates a sectional view of a liquid crystal display device according to a second modification to the embodiment. According to the second modification, as illustrated in FIG. 12, the dimming liquid crystal layer 20 is disposed on a surface of the transparent light guide plate 11 of the backlight 10, and is interposed between the transparent light guide plate 11 and a sixth transparent substrate 46. From the perspective of increase in transmittance during the transparent display, it is preferable that another member be not disposed between the transparent light guide plate 11 and the dimming liquid crystal layer 20, and the transparent light guide plate 11 and the dimming liquid crystal layer 20 be in contact with each other. According to the second modification, the front polarizer 71 may be disposed on the front surface of the first transparent substrate 41, and the back polarizer 72 may be disposed on the back surface of the second transparent substrate 42.

An air layer may be provided between the second transparent substrate 42 and the sixth transparent substrate 46, or the transparent adhesive layer 61 may be disposed therebetween. The transparent adhesive layer 61 is more preferably disposed because the same degree of the transmittance as that of the liquid crystal display device illustrated in FIG. 1 is obtained. One of the examples of the first to third transparent substrates described above may be used as the sixth transparent substrate 46.

While there have been described what are at present considered to be certain embodiments of the invention, it will be understood that various modifications may be made thereto, and it is intended that the appended claims cover all such modifications as fall within the true spirit and scope of the invention.

The invention claimed is:

1. A display device that performs color display and that performs transparent display, such that a background is seen through, the display device comprising:
    a display portion having a display region provided with a plurality of pixels; and
    a dimming portion at which a light diffusion state and a light transmission state are switched by voltage application,
    wherein the display portion and the dimming portion are provided sequentially from an observer side,
    the dimming portion has a larger area than the display region,
    during the color display, the dimming portion is in the light diffusion state and the display portion displays an image in the display region, and
    during the transparent display, the dimming portion is in the light transmission state and the display portion does not display any image in the display region.

2. The display device according to claim 1, wherein the dimming portion includes a liquid crystal layer interposed between a first transparent substrate and a second transparent substrate.

3. The display device according to claim 1, wherein
    the dimming portion is a dimming liquid crystal layer,
    the dimming liquid crystal layer comprises:
        a first transparent conductive film formed at a liquid crystal layer side of a first transparent substrate, and
        a second transparent conductive film formed at a liquid crystal layer side of a second transparent substrate,
    the first transparent conductive film and the second transparent conductive film are disposed to overlap an entirety of the display region, and
    either one of the first transparent conductive film and the second transparent conductive film is connected to a circuit configured to drive the dimming liquid crystal layer.

4. The display device according to claim 1, wherein
    a haze value of the dimming portion in the light diffusion state is 60% or more and less than 80%.

5. The display device according to claim 1, wherein the dimming portion during no voltage application or during voltage application is in the light transmission state.

6. A display device that performs color display and that performs transparent display, such that a background is seen through, the display device comprising:

a display portion having a display region provided with a plurality of pixels; and a dimming portion at which a light diffusion state and a light transmission state are switched voltage application, wherein the display portion and the dimming portion are provided sequentially from an observer side, the dimming portion is disposed to overlap the display region, an entirety of the dimming portion is transmissive during no voltage application or during voltage application, during the color display, the dimming portion is in the light diffusion state and the display portion displays an image in the display region, and during the transparent display, the dimming portion is in the light transmission state and the display portion does not display any image in the display region.

7. The display device according to claim 6, wherein the dimming portion has a larger area than the display region.

8. The display device according to claim 6, wherein the dimming portion includes a liquid crystal layer interposed between a first transparent substrate and a second transparent substrate.

9. A display device according to claim 6, wherein
the dimming portion is a dimming liquid crystal layer,
the dimming liquid crystal layer comprises
   a first transparent conductive film formed at a liquid crystal layer side of a first transparent substrate, and
   a second transparent conductive film formed at a liquid crystal layer side of a second transparent substrate,
the first transparent conductive film and the second transparent conductive film are disposed to overlap an entirety of the display region, and
either one of the first transparent conductive film and the second transparent conductive film is connected to a circuit configured to drive the dimming liquid crystal layer.

10. The display device according to claim 6, wherein a haze value of the dimming portion in the light diffusion state is 60% or more and less than 80%.

11. The display device according to claim 1, wherein a transmittance of the dimming portion in the light transmission state is 90% or more.

12. The display device according to claim 6, wherein a transmittance of the dimming portion in the light transmission state is 90% or more.

13. The display device according to claim 1, wherein a plate-like transparent base material is disposed at a position opposite a position of the display portion with the dimming portion interposed therebetween.

14. The display device according to claim 6, wherein a plate-like transparent base material is disposed at a position opposite a position of the display portion with the dimming portion interposed therebetween.

15. The display device according to claim 1, wherein an observer can slightly see the background.

16. The display device according to claim 6, wherein an observer can slightly see the background.

17. The display device according to claim 1, further comprising:
   a transparent adhesive layer disposed between the display portion and the dimming portion, wherein
   the transparent adhesive layer is in direct contact with the display portion and the dimming portion.

18. The display device according to claim 6, further comprising:
   a transparent adhesive layer disposed between the display portion and the dimming portion, wherein
   the transparent adhesive layer is in direct contact with the display portion and the dimming portion.

* * * * *